United States Patent
Yang et al.

(10) Patent No.: US 10,023,759 B2
(45) Date of Patent: Jul. 17, 2018

(54) AQUEOUS DISPERSION AND COATING COMPOSITION COMPRISING THE SAME

(71) Applicants: Dow Global Technologies LLC, Midland, MI (US); Rohm and Haas Company, Philadelphia, PA (US)

(72) Inventors: Xiaohong Yang, Shanghai (CN); Yawei Xu, Shanghai (CN); Baoqing Zheng, Shanghai (CN); Biao Shen, Shanghai (CN)

(73) Assignees: Dow Global Technologies LLC, Midland, MI (US); Rohm and Haas Company, Philadelphia, PA (US)

( * ) Notice: Subject to any disclaimer, the term of this patent is extended or adjusted under 35 U.S.C. 154(b) by 31 days.

(21) Appl. No.: 15/127,578

(22) PCT Filed: Apr. 17, 2014

(86) PCT No.: PCT/CN2014/075544
§ 371 (c)(1),
(2) Date: Sep. 20, 2016

(87) PCT Pub. No.: WO2015/157950
PCT Pub. Date: Oct. 22, 2015

(65) Prior Publication Data
US 2017/0145244 A1    May 25, 2017

(51) Int. Cl.
*C09D 133/06* (2006.01)
*C08L 33/06* (2006.01)
*C09D 5/00* (2006.01)

(52) U.S. Cl.
CPC ........ *C09D 133/066* (2013.01); *C08L 33/066* (2013.01); *C09D 5/00* (2013.01); *C08L 2201/54* (2013.01)

(58) Field of Classification Search
CPC ........ C09D 5/00; C09D 133/06; C08L 33/066
See application file for complete search history.

(56) References Cited

U.S. PATENT DOCUMENTS

| 6,900,265 B2 | 5/2005 | Schultz et al. |
| 8,158,714 B2 | 4/2012 | Nair et al. |
| 2006/0047062 A1 | 3/2006 | Hsu et al. |
| 2008/0014672 A1 | 1/2008 | Ukai |
| 2010/0240822 A1 | 9/2010 | Trezzi et al. |

FOREIGN PATENT DOCUMENTS

| CN | 1858080 A | 11/2006 |
| CN | 101817906 A | 9/2010 |
| CN | 103193924 A | 7/2013 |
| JP | 2003165803 A | 6/2003 |
| JP | 2006342221 A | 12/2006 |
| JP | 2008063567 A | 3/2008 |
| JP | 2009270035 A | 11/2009 |
| WO | 9802491 A1 | 1/1998 |

OTHER PUBLICATIONS

Machine translation of CN 101817906 original document date (2010).*
International Search Report for International Application No. PCT/CN2014/075544; International Filing Date Apr. 17, 2014; dated Jan. 21, 2015; 3 pages.
Written Opinion of the International Search Report for International Application No. PCT/CN2014/075544; International Filing Date Apr. 17, 2014; dated Jan. 21, 2015; 4 pages.
Machine Translation for JP2006342221, Dated Oct. 2, 2017.
Machine Translation for JP2008063567, Dated Oct. 2, 2017.
Machine Translation for JP2009270035, Dated Oct. 2, 2017.
Leo, Albert J; Chemical Reviews, vol. 93, No. 4 pp. 1281-1306, Jun. 1993.
Peyser, P.; Polymer Handbook, 3rd Edition, 1989, Chapter VI, Glass Transition Temperatures of Polymers, pp. 215-221 and 226-227.

* cited by examiner

*Primary Examiner* — Edward J Cain
(74) *Attorney, Agent, or Firm* — Karl E. Stauss; Cantor Colburn LLP

(57) ABSTRACT

An aqueous dispersion capable of providing a coating composition with balanced properties of early block resistance and good chemical resistance including water resistance, 48% alcohol resistance, and paraffin oil resistance; a process of preparing the same; and a coating composition comprising the same.

14 Claims, No Drawings

AQUEOUS DISPERSION AND COATING COMPOSITION COMPRISING THE SAME

FIELD OF THE INVENTION

The present invention relates to an aqueous dispersion and a coating composition comprising the same.

INTRODUCTION

Aqueous polymer dispersions are widely used in waterborne coating compositions such as wood coating compositions. Waterborne coatings have to satisfy a balance of properties such as chemical resistance and handling properties. Waterborne wood coatings in many applications such as in kitchens, bathrooms and dining tables are required to have good chemical resistance including water-resistance, 48% alcohol resistance, and paraffin oil resistance to meet industry requirements. Moreover, waterborne coatings need to have satisfactory handling properties. For example, an early block resistance of at least C-0 according to the GB/T 23982-2009 standard increases production efficiency and avoids potential coatings damages when separating two coated surfaces that are stacked or placed in contact with one another during storage, packaging and/or shipping.

The chemical resistance and early block resistance properties are, however, usually incompatible with each other. It is often a challenge for wood coatings to achieve a satisfactory balance of both properties. Use of polymer dispersions made from a high level of soft hydrophobic monomers such as 2-ethylhexyl acrylate (for example, at more than 40% by weight of the polymer) may provide wood coatings with sufficient chemical resistance to meet the above industry requirements, but unsatisfactory early block resistance. Wood coatings made from polymer dispersions with a high level of crosslinking agents (for example, at more than 4% by weight of the polymer) may have desired early block resistance, but insufficient chemical resistance.

Therefore, it is desirable to provide an aqueous polymer dispersion particularly suitable for coating applications that provides coating films with balanced properties of good chemical resistance and satisfactory early block resistance.

SUMMARY OF THE INVENTION

The present invention provides a novel aqueous polymer dispersion particularly useful for wood coating applications. A coating composition comprising such aqueous polymer dispersion is capable of providing coating films with good chemical resistance including a water-resistance level of at least 4, and a 48% alcohol-resistance level of at least 4, and a paraffin oil resistance level of at least 4, according to the BS: EN12720:2009 method. This coating composition also provides coating films with an early block resistance of C-0 or better according to the GB/T 23982-2009 method.

In a first aspect, the present invention is an aqueous dispersion comprising, (A) copolymer particles, wherein the copolymer comprises as polymerized units, based on the weight of the copolymer, (i) from 0.5 weight percent (wt %) to 2 wt % of an allyl ether phosphate functional monomer;

(ii) from 0.1 wt % to 10 wt % of an ethylenically unsaturated hydroxy-functional monomer;

(iii) from 0.1 wt % to 10 wt % of a self-crosslinking monomer;

(iv) from 0.01 wt % to 1.5 wt % of an ethylenically unsaturated monomer having at least one alkoxysilane functionality;

(v) from 28 wt % to 46 wt % of a (meth)acrylate $C_6$-$C_{22}$ alkyl ester nonionic hydrophobic monomer; and (vi) ethylenically unsaturated nonionic monomers comprising at least one hydrophobic monomer and at least one hydrophilic monomer, excluding monomers (i), (ii), (iii), (iv) and (v); wherein the weight ratio of the hydrophobic monomer to the hydrophilic monomer is from 0.5 to 2.0;

(B) from 0.3 wt % to 5 wt % of an alkyl ethoxylated phosphate or alkylphenol ethoxylated phosphate surfactant, based on the weight of the copolymer; and (C) from 0 to 10 wt % of a compound containing at least two —$NH_2$ or —NH— functionality, or a polyfunctional carboxylic hydrazide containing at least two hydrazide groups per molecule, based on the weight of the copolymer.

In a second aspect, the present invention is an aqueous dispersion comprising:

(A) copolymer particles, wherein the copolymer comprises as polymerized units, based on the weight of the copolymer, (i) from 0.5 wt % to 1.5 wt % of an allyl ether phosphate functional monomer;

(ii) from 0.1 wt % to 3 wt % of an ethylenically unsaturated hydroxy-functional monomer;

(iii) from 1 wt % to 3 wt % of diacetone acrylamide;

(iv) from 0.1 wt % to 1.3 wt % of an ethylenically unsaturated alkoxysilane-functional monomer having the following formula:

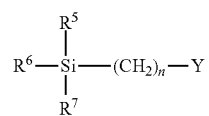

$$R^6\text{—}\underset{\underset{R^7}{|}}{\overset{\overset{R^5}{|}}{Si}}\text{—}(CH_2)_n\text{—}Y \quad\quad (IV)$$

wherein $R^5$, $R^6$, and $R^7$ each is independently selected from the group consisting of an alkoxy group and an alkyl group with the proviso that at least one alkoxy group is present, n is an integer from 0 to 4, and Y is a group selected from vinyl, methacryloxy, or mixtures thereof;

(v) from 32 wt % to 40 wt % of 2-ethylhexyl acrylate; and (vi) ethylenically unsaturated nonionic monomers comprising at least one hydrophobic monomer selected from styrene or substituted styrene, butyl (meth)acrylate, isobutyl (meth)acrylate, or mixtures thereof; and at least one hydrophilic monomer selected from methyl (meth)acrylate, ethyl acrylate, (meth)acrylic acid, acrylonitrile, (meth)acrylamide, polyethylene glycol (meth)acrylate, or mixtures thereof; excluding monomers (i), (ii), (iii), (iv) and (v); wherein the weight ratio of the hydrophobic monomer to the hydrophilic monomer is from 0.5 to 2.0;

(B) from 0.8 wt % to 1.7 wt % of an alkyl ethoxylated phosphate or alkylphenol ethoxylated phosphate surfactant, based on the weight of the copolymer; and (C) from 0.5 wt % to 1.5 wt % of adipic dihydrazide, based on the weight of the copolymer.

In a third aspect, the present invention is a coating composition comprising the aqueous dispersion of the first or the second aspect.

In a fourth aspect, the present invention is a process of preparing the aqueous dispersion of the first or the second aspect. The process comprises:

(I) forming copolymer particles by emulsion polymerization from monomers in the presence of from 0.3 wt % to 5 wt % of an alkyl ethoxylated phosphate or alkylphenol ethoxylated phosphate surfactant, wherein the monomers comprise, based on the total weight of the monomers:

(i) from 0.5 wt % to 2 wt % of an allyl ether phosphate functional monomer;

(ii) from 0.1 wt % to 10 wt % of an ethylenically unsaturated hydroxy-functional monomer;

(iii) from 0.1 wt % to 10 wt % of a self-crosslinking agent;

(iv) from 0.01 wt % to 1.5 wt % of an ethylenically unsaturated alkoxysilane-functional monomer;

(v) from 28 wt % to 46 wt % of a (meth)acrylate $C_6$-$C_{22}$ alkyl ester nonionic hydrophobic monomer; and (vi) ethylenically unsaturated nonionic monomers comprising at least one hydrophobic monomer and at least one hydrophilic monomer, excluding monomers (i), (ii), (iii), (iv) and (v), wherein the weight ratio of the hydrophobic monomer to the hydrophilic monomer is from 0.5 to 2.0; and (II) adding from 0 to 10 wt % of a compound containing at least two —$NH_2$ or —NH— functionality, or a polyfunctional carboxylic hydrazide containing at least two hydrazide groups per molecule, based on the weight of the copolymer.

DETAILED DESCRIPTION OF THE INVENTION

The use of the term "(meth)" followed by another term such as (meth)acrylate refers to both acrylate, methacrylate or mixtures thereof.

"Hydrophobic monomer" in the present invention refers to a monomer that has a Hansch value ≥2.20. "Hydrophilic monomer" in the present invention refers to a monomer that has a Hansch value <2.20. Hansch value herein may be determined by the method described by A. J. Leo in Chem. Rev., 93(4):1281-1306 (1993).

The aqueous dispersion of the present invention comprises copolymer particles. The copolymer useful in the present invention may comprise, as polymerized units, (i) one or more allyl ether phosphate functional monomers. The allyl ether phosphate functional monomers can be in an acid form, in a salt form, or in a neutralized form, or can be partially acidic and partially neutralized. The allyl ether phosphate functional monomer useful in the present invention may have the following formula (I):

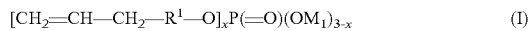

wherein $R^1$ is a linking divalent group, x is an average number ranging from 1 to 2, and each M independently comprises a hydrogen atom or a cationic counter-ion.

$R^1$ can be a divalent alkylene group having from 2 to 20 carbon atoms or a (poly)oxyalkylene group. In some embodiments, $R^1$ is a (poly)oxyalkylene group. Examples of suitable (poly)oxyalkylene groups include —[O—$CH_2$—$CH_2$]$_n$—, —[O—$CH_2$—$CH(CH_3)$]$_n$—, —[O—$CH(CH_3)$$CH_2$]$_n$—, or combinations thereof, wherein n is an average number of from 1 to 10, and preferably from 2 to 6. In a preferred embodiment, $R^1$ is —[O—$CH_2$—$CH_2$]$_n$—, wherein n is an average number ranging from 2 to 10. Number x can be from 1.0 to 1.5. In some embodiments, $M_1$ is a cationic counter-ion, for example, $NH_4$, $Na^+$ or $K^+$. The allyl ether phosphate functional monomer can be a mixture of a mono-phosphate ester of formula (I) when x is 1 and a phosphate diester of formula (I) when x is 2. Suitable commercially available allyl ether phosphate functional monomers include, for example, SIPOMER™ COPS-3 allyl ether phosphate ammonium salt available from Solvay. The copolymer useful in the present invention may comprise, based on the weight of the copolymer, 0.5 wt % or more of the copolymerized allyl ether phosphate functional monomer, or even 0.7 wt % or more, and at the same time, 2 wt % or less, or even 1.5 wt % or less.

The copolymer useful in the present invention may further comprise, as polymerized units, (ii) one or more ethylenically unsaturated hydroxy-functional monomers. The ethylenically unsaturated hydroxy-functional monomers useful in the present invention may have the structure of formula (II):

wherein $R^2$ is hydrogen or methyl and $R^3$ is a hydroxyalkyl group having from 2 to 6 carbon atoms.

Examples of suitable ethylenically unsaturated hydroxy-functional monomers include hydroxyethyl (meth)acrylate, hydroxypropyl (meth)acrylate, hydroxybutyl (meth)acrylate, or mixtures thereof. In some embodiments, 2-hydroxylethyl methacrylate is used as the ethylenically unsaturated hydroxy-functional monomer. The copolymer useful in the present invention may comprise, based on the weight of the copolymer, 0.1 wt % or more of the copolymerized ethylenically unsaturated hydroxy-functional monomer, or even 0.5 wt % or more, and at the same time, 10 wt % or less, 5 wt % or less, or even 3 wt % or less.

The copolymer useful in the present invention may further comprise, as polymerized units, (iii) one or more self-crosslinking monomers. "Self-crosslinking monomers" refer to ethylenically unsaturated monomers containing an acetoacetoxy group, an acetoacetamide group, or a diacetone acrylamide functional group. Suitable self-crosslinking monomers include, for example, diacetone acrylamide (DAAM), acetoacetoxyethyl (meth)acrylate, acetoacetoxypropyl (meth)acrylate, acetoacetoxybutyl (meth)acrylate, 2,3-di(acetoacetoxy) propyl (meth)acrylate, allyl acetoacetates, vinyl acetoacetates, acetoacetamides of formula (III):

wherein $R^4$ is H or methyl, or combinations thereof. Preferred self-crosslinking monomers are selected from DAAM, acetoacetoxyethyl (meth)acrylate, acetoacetoxypropyl (meth)acrylate, allyl acetoacetate, acetoacetoxybutyl (meth)acrylate, 2,3-di(acetoacetoxy)propyl (meth)acrylate, or mixtures thereof. In a preferred embodiment, DAAM is used as the self-crosslinking monomer.

The copolymer useful in the present invention may comprise, based on the weight of the copolymer, 0.1 wt % or more of the copolymerized self-crosslinking monomer, or even 1 wt % or more, and at the same time, 10 wt % or less, 5 wt % or less, or even 3 wt % or less.

The copolymer useful in the present invention may further comprise, as polymerized units, (iv) one or more ethylenically unsaturated monomers having at least one alkoxysilane functionality (hereinafter referred to as "alkoxysilane-functional ethylenically unsaturated monomer"). Such alkoxysilane-functional ethylenically unsaturated monomer useful in the present invention may have the following formula (IV):

(IV)

wherein $R^5$, $R^6$, and $R^7$ each is independently selected from the group consisting of an alkoxy group and an alkyl group with the proviso that at least one alkoxy group is present, n is an integer from 0 to 4, and Y is a group selected from vinyl, methacryloxy, or mixtures thereof. One or two of $R^5$, $R^6$ and $R^7$ groups can be an alkyl group having from 1 to 10 carbon atoms, or from 1 to 8 carbon atoms. $R^5$, $R^6$ and $R^7$ each may independently be an alkoxy group having from 1 to 8 carbon atoms, or from 1 to 4 carbon atoms. n in formula (IV) can be from 1 to 3. Preferably, Y in formula (IV) is methacryloxy.

Examples of suitable alkoxysilane-functional ethylenically unsaturated monomers include vinyltrialkoxysilanes such as vinyltrimethoxysilane, vinyl triethoxy silane, and vinyl tris(β-methoxy ethoxy)-silane; alkylvinyldialkoxysilanes such as vinylmethyldimethoxysilane; (meth)acryloxyalkyltrialkoxysilanes such as (meth)acryloxyethyltrimethoxysilane and (meth)acryloxypropyltrimethoxysilane; or mixtures thereof. Suitable commercially available such monomers include, for example, SILQUEST™ A-174 γ-methacryloxypropyl trimethoxysilane and SILQUEST A-171 vinyltrimethoxysilane available from Momentive Performance Materials Inc., or mixtures thereof.

The copolymer useful in the present invention may comprise, based on the weight of the copolymer, 0.01 wt % or more of the copolymerized alkoxysilane-functional ethylenically unsaturated monomer, 0.1 wt % or more, or even 0.5 wt % or more, and at the same time, 1.5 wt % or less, or even 1.3 wt % or less.

The copolymer useful in the present invention may further comprise, as polymerized units, (v) one or more (meth) acrylate $C_6$-$C_{22}$ alkyl ester nonionic hydrophobic monomers. "Nonionic monomers" refer to monomers that do not bear an ionic charge between pH=1-14. Suitable (meth)acrylate $C_6$-$C_{22}$ alkyl ester nonionic hydrophobic monomers include, for example, (meth)acrylic esters such as 2-ethylhexyl (meth)acrylate, cyclohexyl (meth)acrylate, tetradecyl (meth)acrylate, oleyl (meth)acrylate, palmityl (meth)acrylate, stearyl (meth)acrylate, decyl (meth)acrylate, lauryl (meth)acrylate, and isodecyl (meth)acrylate; succinates such as dihexyl succinate and didecyl succinate; vinyl esters such as vinyl versatate; or mixtures thereof. In some embodiments, the (meth)acrylate $C_6$-$C_{22}$ alkyl ester nonionic monomer is selected from 2-ethylhexyl (meth)acrylate, decyl (meth)acrylate, lauryl (meth)acrylate, isodecyl (meth)acrylate, or mixtures thereof. In a preferred embodiment, the (meth)acrylate $C_6$-$C_{22}$ alkyl ester nonionic monomer is selected from 2-ethylhexyl (meth)acrylate, lauryl (meth) acrylate, or mixtures thereof. In a more preferred embodiment, 2-ethylhexyl acrylate is used as the (meth)acrylate $C_6$-$C_{22}$ alkyl ester nonionic hydrophobic monomer.

The copolymer useful in the present invention may comprise, based on the weight of the copolymer, 28 wt % or more of the copolymerized (meth)acrylate $C_6$-$C_{22}$ alkyl ester nonionic hydrophobic monomer, or even 32 wt % or more, and at the same time, 46 wt % or less, or even 40 wt % or less.

The copolymer useful in the present invention may further comprise, as polymerized units, (vi) ethylenically unsaturated nonionic monomers excluding monomers (i), (ii), (iii), (iv) and (v). The ethylenically unsaturated nonionic monomers (vi) may comprise at least one hydrophobic monomer and at least one hydrophilic monomer, wherein the weight ratio of the hydrophobic monomer to the hydrophilic monomer is from 0.5 to 2.0, or from 0.5 to 1.5. Examples of suitable hydrophobic monomers include styrene or substituted styrene, butyl (meth)acrylate, iso-butyl (meth)acrylate, or mixtures thereof. Examples of suitable hydrophilic monomers include methyl (meth)acrylate, ethyl acrylate, (meth) acrylic acid, acrylonitrile, (meth)acrylamide, methylol (meth)acrylamide, acrolein, polyethylene glycol (meth) acrylate, or mixtures thereof. In a preferred embodiment, the ethylenically unsaturated nonionic monomers (vi) comprise the hydrophobic monomer including styrene and the hydrophilic monomer including methyl methacrylate. The combined amount of the hydrophobic and the hydrophilic monomers in the ethylenically unsaturated nonionic monomers (vi) can be adjusted so that the total amount of monomers is 100 wt %. For example, the copolymer useful in the present invention may comprise, based on the weight of the copolymer, from 30 wt % to 72 wt % of the copolymerized ethylenically unsaturated nonionic monomer (vi), or from 51 wt % to 67 wt %.

The types and levels of the monomers described above may be chosen to provide the copolymer with a glass transition temperature ("$T_g$") suitable for different applications. The glass transition temperature of the copolymer may be in the range of from –35° C. to 60° C., from –15° C. to 40° C., or from –10° C. to 30° C. The $T_g$ values used herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_1)$ is the glass transition temperature of the homopolymer of $M_1$, and $T_g(M_2)$ is the glass transition temperature of the homopolymer of $M_2$, all temperatures being in K. The glass transition temperatures of monomers may be found, for example, in "Polymer Handbook", edited by J. Brandrup and E. H. Immergut, Interscience Publishers.

The copolymer particles in the aqueous dispersion of the present invention typically have an average diameter in the range of from 50 nanometers (nm) to 350 nm, in the range of from 60 nm to 200 nm, or in the range of from 80 nm to 150 nm. The average diameter of the copolymer particles may be determined by a quasi-elastic light scattering technique, using an instrument such as a Brookhaven Model BI-90 Particle Sizer, supplied by Brookhaven Instruments Corporation, Holtsville, N.Y.

In addition to the copolymer particles described above, the aqueous dispersion of the present invention also comprises one or more alkyl ethoxylated phosphate or alkylphenol ethoxylated phosphate surfactants, which may be provided in the acid form or in the salt form.

The alkyl ethoxylated phosphate or alkylphenol ethoxylated phosphate surfactant useful in the present invention may comprise a $C_8$ to $C_{18}$ alkyl group attached to a polyoxyethylene chain, or a $C_8$ to $C_{18}$ alkyl substituted phenol group attached to a polyoxyethylene chain. The polyoxyethylene chain may have an average degree of polymerization in the range of from 1 to 20. The alkyl ethoxylated phosphate or alkylphenol ethoxylated phosphate surfactant may be represented by the following formula (V):

$$R^8\text{—}O\text{—}(CH_2CH_2O)_n\text{—}P(\!\!=\!\!O)(OR^9)(OM_2) \qquad (V)$$

wherein $R^8$ is a $C_8$ to $C_{18}$ alkyl group or a $C_8$ to $C_{18}$ alkyl substituted phenol group; n is an integer from 1 to 20; $R^9$ is H or a group of —$(CH_2CH_2O)_n$—$R^{9a}$, in which $R^{9a}$ is as defined for $R^8$; and $M_2$ is H, Li, K, Na or $NH_4$. In some embodiments, n can be from 3 to 16, or from 4 to 12. The alkyl ethoxylated phosphate or alkylphenol ethoxylated phosphate surfactant may have a $C_{12}$ to $C_{18}$ alkyl group that is directly attached to the polyoxyethylene chain or present as a substitution group on the phenol group. Suitable commercially available alkyl ethoxylated phosphate or alkylphenol ethoxylated phosphate surfactants include, for example, POLYSTEP™ P-12A from Stepan, RHODAFAC™ RS-610-A25 from Solvay, or mixtures thereof. The combined concentration of the alkyl ethoxylated phosphate surfactant and alkylphenol ethoxylated phosphate surfactant in the aqueous dispersion may be, based on the weight of the aqueous dispersion, 0.3 wt % or more, 0.5 wt % or more, or even 0.8 wt % or more, and at the same time, 5 wt % or less, 3 wt % or less, or even 1.7 wt % or less.

The aqueous dispersion of the present invention may also comprise (C) one or more compounds containing at least two —$NH_2$ or —NH— functionality, or one or more polyfunctional carboxylic hydrazides containing at least two hydrazide groups per molecule, in an amount of from 0 to 10 wt %, from 0.1 wt % to 5 wt %, or from 0.5 wt % to 1.5 wt %, based on the weight of the copolymer. This component (C) may act as a crosslinker for carbonyl groups. The compound containing at least two —$NH_2$ or —NH— functionality may include, for example, hydrazine; aliphatic polyamines such as ethylene diamine, propanediamine, butanediamine, hexanediamine, isophorone diamine, piperazine, diethylene triamine, dipropylene triamine, triethylene tetramine, and oligomers or polymers of ethylene diamine known as polyethylene amines; or mixtures thereof. Examples of suitable polyfunctional carboxylic hydrazides include adipic dihydrazide, oxalic dihydrazide, isophthalic dihydrazide, polyacrylic polyhydrazide, or mixtures thereof. Preferably, the polyfunctional carboxylic hydrazide is adipic dihydrazide. In some embodiments, the aqueous dispersion comprises adipic dihydrazide when the copolymer comprises the polymerized units of DAAM.

The aqueous dispersion of the present invention may be prepared by polymerization techniques well known in the art such as suspension polymerization or emulsion polymerization of the monomers described above. Emulsion polymerization techniques for preparing the aqueous dispersion of the copolymer particles are well known in the polymer arts, and include multiple stage polymerization processes. For each monomer, the concentration of the monomer based on the total weight of monomers used in preparing the aqueous dispersion is substantially the same as the concentration of copolymerized such monomer based on the total weight of the copolymer. Emulsion polymerization is a preferred process for preparing the copolymer particles. The aqueous dispersion of the present invention may be prepared by emulsion polymerization from the monomers described above in the presence of the alkyl ethoxylated phosphate or alkylphenol ethoxylated phosphate surfactant. Temperature suitable for emulsion polymerization processes may be lower than 100° C., in the range of from 30° C. to 95° C., or in the range of from 50° C. and 90° C. A mixture of the monomers may be added neat or as an emulsion in water. The monomer mixture may be added in one or more additions or continuously, linearly or nonlinearly, over the reaction period, or combinations thereof. The alkyl ethoxylated phosphate or alkylphenol ethoxylated phosphate surfactant may be added prior to or during the polymerization of the monomers, or combinations thereof. A portion of the surfactant can also be added after the polymerization. The total amount of the alkyl ethoxylated phosphate or alkylphenol ethoxylated phosphate surfactant added is the same as the above described combined concentration of such surfactants in the aqueous dispersion of the present invention. In some embodiments, the process of preparing the aqueous dispersion of the present invention further includes adding the compound containing at least two —$NH_2$ or —NH— functionality, or the polyfunctional carboxylic hydrazide after the polymerization, in an amount of from 0 to 10 wt %, from 0.1 wt % to 5 wt %, or from 0.5 wt % to 1.5 wt %, based on the total weight of monomers.

In the emulsion polymerization process, free radical initiators may be used. Examples of suitable free radical initiators include hydrogen peroxide, sodium peroxide, potassium peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 wt % to 3.0 wt %, based on the total weight of monomers. Redox systems comprising the above described initiators coupled with a suitable reductant may be used in the emulsion polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, hydroxymethanesulfonic acid, acetone bisulfite, glycolic acid, glyoxylic acid hydrate, lactic acid, glyceric acid, malic acid, tartaric acid and salts of the preceding acids. Redox reaction catalyzing metal salts of iron, copper, manganese, silver, platinum, vanadium, nickel, chromium, palladium, or cobalt may be used. Chelating agents for the metals may optionally be used.

In the emulsion polymerization process, one or more chain transfer agents may also be used. Examples of suitable chain transfer agents include 3-mercaptopropionic acid, dodecyl mercaptan, methyl 3-mercaptopropionate, benzenethiol, azelaic alkyl mercaptan, or mixtures thereof. When present, the concentration of the chain transfer agent may be, based on the total weight of monomers, from 0.01 wt % to 5 wt %, from 0.05 wt % to 2 wt %, or from 0.1 wt % to 0.5 wt %.

In the emulsion polymerization process, organic bases and/or inorganic bases as neutralizers may also be used. Suitable bases include ammonia, sodium hydroxide, potassium hydroxide, zinc oxide, mono-ethanolamine, triethyl amine, diethyl amine, dimethyl amine, sodium borate, potassium borate, aluminum hydroxide, or combinations thereof.

The aqueous dispersion of the present invention may comprise, based on the total weight of the aqueous dispersion, from 30 wt % to 70 wt % of the copolymer particles, from 35 wt % to 60 wt %, or from 40 wt % to 50 wt %; and the rest of the aqueous dispersion may be water.

The coating composition of the present invention comprises the aqueous dispersion described above. The coating composition may comprise from 50 wt % to 85 wt % of the aqueous dispersion, or from 60 wt % to 75 wt % of the aqueous dispersion, based on the total weight of the coating composition.

The coating composition of the present invention may also comprise one or more matting agents. "Matting agents" herein refer to any inorganic or organic particles that provide matt effect. The matting agents useful in the present invention may be a silica, polyurea, polyacrylate, polyethylene, polytetrafluoroethylene matting agent, or mixtures thereof. The matting agent may be in the form of powders or an emulsion. Preferably, matting agent powders are used. Suitable commercially available matting agents include, for example, ACEMATT™ TS-100 and ACEMATT OK520 silica matting agents both available from Evonik, DEUTERON™ MK polyurea matting agent available from Deuteron, SYLOID™ Silica 7000 matting agent available from Grace Davison, PARALOID™ PRD 137B polyacrylate emulsion available from The Dow Chemical Company (PARALOID is a trademark of The Dow Chemical Company); ULTRALUBE™ D277 HDPE/plastic emulsion, ULTRALUBE D818 montan/PE/plastic emulsion and ULTRALUBE D860 PE/ester emulsion all available from Keim-Additec; or mixtures thereof. When present, the concentration of the matting agent may be, based on the total solids weight of the coating composition, 0.2 wt % or more, or even 0.5 wt % or more, and at the same time, 4 wt % or less, 3.5 wt % or less, or even 3 wt % or less.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. Suitable commercially available wetting agents include, for example, SURFYNOL™ 104 nonionic wetting agent based on an actacetylenic diol available from Air Products, BYK™-346 and BYK™-349 polyether-modified siloxanes both available from BYK, or mixtures thereof. When present, the concentration of the wetting agent may be, based on the total weight of the coating composition, 0.1 wt % or more, or even 0.5 wt % or more, and at the same time, 2 wt % or less, or even 1 wt % or less.

The coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO™ Airex 902 W and TEGO Foamex 1488 polyether siloxane copolymer emulsions both available from Tego, BYK-024 silicone defoamer available from BYK, or mixtures thereof. When present, the concentration of the defoamer may be, based on the total weight of the coating composition, from 0.01 wt % to 1 wt %, from 0.05 wt % to 0.8 wt %, or from 0.1 wt % to 0.5 wt %.

The coating composition of the present invention may further comprise one or more thickeners. The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickener is based on HEUR, for example, ACRYSOL™ RM-8W thickener available from The Dow Chemical Company (ACRYSOL is a trademark of The Dow Chemical Company). When present, the concentration of the thickener is, based on the total weight of the coating composition, generally from 0.05 wt % to 3 wt %, from 0.1 wt % to 2 wt %, or from 0.3 wt % to 1 wt %.

The coating composition of the present invention may also comprise one or more coalescents. "Coalescents" herein refer to slow-evaporating or non-evaporating solvents that fuse polymer particles into a continuous film under ambient condition. Examples of suitable coalescents include ethylene glycol monobutyl ether, ethylene glycol monopropyl ether, ethylene glycol monohexyl ether, ethylene glycol 2-ethyl hexyl ether, ethylene glycol phenyl ether, diethylene glycol monomethyl ether, diethylene glycol monoethyl ether, diethylene glycol monopropyl ether, diethylene glycol monobutyl ether, diethylene glycol monohexyl ether, propylene glycol monomethyl ether, propylene glycol monopropyl ether, propylene glycol tertiary butyl ether, propylene glycol monobutyl ether, dipropylene glycol monopropyl ether, dipropylene glycol tertiary butyl ether, dipropylene glycol monobutyl ether, tripropylene glycol methyl ether, aromatic based glycol ether, 2,2,4-trimethyl-1,3-pentanediol monoisobutyrate, benzyl alcohol, n-methyl pyrolidone, diacetone alcohol, dimethyl phthalate, and mixtures thereof. Preferred coalescents are dimethyl phthalate; 2,2,4-trimethyl-1,3-pentanediolmono(2-methylpropanoate); propylene glycol phenyl ether; diisobutyl glutarate; diisobutyl succinate; diisobutyl adipate; and mixtures thereof. The concentration of the coalescent, based on the total weight of the coating composition, may be from 0 to 12 wt %, or from 2 wt % to 9 wt %.

The coating composition of the present invention may also comprise one or more silane coupling agents having an organofunctional group selected from the group consisting of amino and glycidoxy. Examples of suitable silane coupling agents include γ-(β-amino ethyl) aminopropyl trimethoxysilane, γ-aminopropyl trimethoxysilane, γ-glycidoxypropyltrimethoxysilane, or mixtures thereof. When present, the concentration of the silane coupling agent may be, based on the total weight of the coating composition, from 0.05 wt % to 3 wt %, from 0.1 wt % to 1 wt %, or from 0.2 wt % to 0.8 wt %.

The coating composition of the present invention may further comprise water. The concentration of water may be, based on the total weight of the coating composition, from 30 wt % to 90 wt %, from 40 wt % to 80 wt %, or from 60 wt % to 70 wt %.

In addition to the components described above, the coating composition of the present invention may further comprise any one or combination of the following additives: inorganic extenders, pigments, buffers, neutralizers, humectants, mildewcides, biocides, anti-skinning agents, colorants, flowing agents, anti-oxidants, plasticizers, leveling agents, adhesion promoters, and grind vehicles. When present, these additives may be in a combined amount of from 0.001 wt % to 10 wt %, or from 0.01 wt % to 2 wt %, based on the total weight of the coating composition.

The coating composition of the present invention may be prepared with techniques known in the coating art. The aqueous dispersion of the present invention and other components in the coating composition may be mixed in any order to provide the coating composition of the present invention. Any of the above-mentioned additives may also be added to the coating composition during or prior to the mixing to form the coating composition.

The coating composition of the present invention can be applied to a substrate by incumbent means including brushing, dipping, rolling and spraying. The coating composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition is dried, or is allowed to dry, to form a film. The applied coating composition may be dried, or be allowed to dry, at room temperature (21° C. to 25° C.), or at an elevated temperature, for example, from 35° C. to 60° C. The coating composition provides the film with an early block resistance rating of C-0 or better, and good chemical resistance including a water-resistance level of at least 4, a 48% alcohol-resistance level of at least 4, and a paraffin oil resistance level of at least 4, according to the BS: EN12720:2009 method. In a preferred embodiment, the coating composition of the present invention provides coating films with the above described chemical resistance and early block resistance on a dark substrate, for example, a substrate having an International Commission on Illumination (CIE) L*a*b* color space of L<40, −1<a<1, −1<b<1. The values of L, a and b may be determined by a BYK Gardner Spectro-Guide Sphere Gloss Color Spectrophotometer. In some preferred embodiments, the early block resistance rating of the film even reaches B-0 or better.

The coating composition of the present invention can be applied to, and adhered to, various substrates. Examples of suitable substrates include wood, metals, plastics, foams, stones, elastomeric substrates, glass, fabrics, concrete, or cementious substrates. The coating composition is suitable for various coating applications, such as marine and protective coatings, automotive coatings, wood coatings, coil coatings, plastic coatings, powder coatings, can coatings, and civil engineering coatings. The coating composition is particularly suitable for industrial coatings. The coating composition can be used alone, or in combination with other coatings to form multi-layer coatings.

EXAMPLES

Some embodiments of the invention will now be described in the following Examples, wherein all parts and percentages are by weight unless otherwise specified.

2-ethylhexyl acrylate ("2-EHA"), methacrylic acid ("MAA"), styrene ("ST"), methyl methacrylate ("MMA"), 2-hydroxyethyl methacrylate ("HEMA"), acetoacetoxyethyl (meth)acrylate ("AAEM"), butyl methacrylate ("BMA"), and butyl acrylate ("BA") are all available from Sinoreagent Group, China.

DAAM and adipic dihydrazide ("ADH") are both available from Kyowa Hakko Chemical Co., Ltd.

SIPOMER COPS-3 ("COPS-3"), available from Solvay, is an allyl ether phosphate ammonium salt.

SILQUEST A-174 ("A-174"), available from Momentive Performance Materials Holdings LLC, is γ-methacryloxy-propyl-trimethoxysilane.

POLYSTEP P-12A surfactant ("P-12A"), available from Stepan, is polyethylene glycol tridecyl ether phosphate ammonium salt, the major component of which has the structure of $C_{13}(OCH_2CH_2)_6OPO_3(NH_4)_2$.

Butyl CELLOSOLVE™ glycol ether, available from The Dow Chemical Company, is ethylene glycol monobutyl ether and used as a coalescent (CELLOSOLVE is a trademark of The Dow Chemical Company).

DOWANOL™ DPnB glycol ether, available from The Dow Chemical Company, is dipropylene glycol n-butyl ether and used as a coalescent (DOWANOL is a trademark of The Dow Chemical Company).

TEGO Airex 902 W defoamer is available from Tego.

BYK-346 wetting agent is available from BYK.

DEUTERON MK matting agent, available from Deuteron, is based on polyurea powder and has a D50 particle size of 6.3 microns.

ACRYSOL RM-8W thickener is available from The Dow Chemical Company.

The following standard analytical equipment and methods are used in the Examples.

Early Block Resistance

Early block resistance is measured according to the GB/T 23982-2009 standard.

A wood block (7 cm×5 cm) is balanced at room temperature and 50% humidity for 7 days. One layer of coating is brushed onto the wood block at 80-90 grams per square meter (g/m²) of the wood, cured at room temperature for 3 hours, then sanded with sand paper. The second coating layer is brushed onto the wood block at 80-90 g/m² and cured at room temperature for 24 hours. Two coated wood blocks are then stacked together face to face with 1 kg weight on them and are placed into an oven at 50° C. for 4 hours. Then, the 1 kg weight is removed and the two stacked wood blocks are balanced at room temperature for 1 hour. The two stacked wood blocks are then separated from each other to evaluate the early block resistance.

The rating of the early block resistance property is defined by the separating force and the area of damaging:

A: separated without any force;
B: separated by a slight blow;
C: separated by low force with hands
D: separated by medium force with hands;
E: separated by huge force with hands;
F: separated by tools
The number means area of damage:
0: no damage; 1: ≤1%; 2: 1%-5%; 3: 5%-20%; 4: 20%-50%; 5: ≥50%

A-0 represents the best and F-5 is the worst. The block resistance should be C-0 or better to be acceptable.

Water Resistance, 48% Alcohol Resistance, and Paraffin Oil Resistance

Water resistance, 48% alcohol resistance, and paraffin oil resistance of coating films are determined by the BS EN 12720:2009 method, respectively.

Panels are prepared by brush applying three layers of coats at 80-90 g/m² over wood. The wood is pre-painted with a black colorant to make its L, a and b values in a specific range: L<40, −1<a<1, −1<b<1 (L, a and b values are measured by a BYK Gardner Spectro-Guide Sphere Gloss Color Spectrophotometer). After the first coat, panels are left at room temperature for 4 hours, then sanded with sand paper. The second coating layer is brushed onto the wood substrate and dried at room temperature for 4 hours. After the third coat, panels are dried at room temperature for 4 hours, then placed in an oven at 50° C. for 48 hours before conducting the water resistance, alcohol resistance, or paraffin oil resistance test described below, respectively.

For the water resistance test, disc type filter paper is first saturated with water. The paper is then placed on the above finished panels and covered with a cap to reduce evaporation. After 24 hours, the cap is removed. Tested areas are wiped with wet facial tissues, and dried at room temperature to observe the degree of damage. The degree of damage is defined as the following levels. The higher the rating level, the better the water resistance.

For the 48% alcohol resistance test, filter discs are saturated with 48% alcohol, then placed on the above finished panels and covered with a cap to reduce evaporation. After 1 hour, the cap is removed. Tested areas are wiped with wet facial tissues, and dried at room temperature to observe the damage degree. The degree of damage is defined as the following levels. The higher the rating level, the better the 48% alcohol resistance.

For the paraffin oil resistance test, paraffin oil is dropped on the above finished panels. Paraffin oil was removed. Tested areas are wiped with wet facial tissues, and dried at room temperature to observe the degree of damage. The degree of damage is defined as the following levels. The higher the rating level, the better the paraffin oil resistance.

5—No change: Test area indistinguishable from adjacent surrounding area.

4—Minor change: Test area distinguishable from adjacent surrounding area, only when the light source is mirrored on the test surface and is reflected towards the observer's eye, for example, discoloration; change in gloss and color; and/or no change in the surface structure such as swelling, fiber raising, cracking and/or blistering.

3—Moderate change: Test area distinguishable from adjacent surrounding area, visible in several viewing directions, for example, discoloration; change in gloss and color; and/or no change in the surface structure such as swelling, fiber raising, cracking and/or blistering.

2—Significant change: Test area clearly distinguishable from adjacent surrounding area, visible in all viewing directions, for example, discoloration; change in gloss and color; and/or slightly change in the surface structure such as swelling, fiber raising, cracking and/or blistering.

1—Strong change: The structure of the surface being distinctly changed and/or discoloration, change in gloss and color, and/or the surface material being totally or partially removed, and/or the filter paper adhering to the surface.

Good chemical resistance requires the water resistance, 48% alcohol resistance, and paraffin oil resistance all being 4 or higher.

Gloss

The gloss of coating films is measured according to the ASTM D523 method using a BYK Micro-Tri-Gloss meter.

Example (Ex) 1 Aqueous Dispersion

Monomer Emulsion 1 and Monomer Emulsion 2 were prepared based on formulations described in Table 1.

Preparation of Monomer Emulsion 1: POLYSTEP P-12A surfactant (15.98 grams, 24.66% by weight of solids) was dissolved in deionized water (222.38 g) with stirring. Then 2-EHA (334.82 g), MMA (147.78 g), ST (147.78 g), HEMA (13.10 g), MAA (13.3 g) and A-174 (1.97 g) were slowly added into the resulting surfactant solution to obtain Monomer Emulsion 1.

Preparation of Monomer Emulsion 2: POLYSTEP P-12A surfactant (15.98 g, 24.66% by weight of solids) was dissolved in deionized water (189.8 g) with stirring. Then 2-EHA (163.48 g), MMA (228.88 g), ST (228.88 g), DAAM (19.7 g), and MAA (13.1 g) were added into the resultant surfactant solution to obtain Monomer Emulsion 2.

A solution containing POLYSTEP P-12A surfactant (26.52 g, 24.66% by weight of solids), SIPOMER COPS-3 (32.80 g, 40% by weight of solids) and deionized water (773.88 g) was added into a 4-neck, 5 liter round bottom flask equipped with a thermocouple, a cooling condenser and an agitator, and was heated to 85° C. under nitrogen atmosphere. An aqueous sodium carbonate solution (2.0 g sodium carbonate in 56 g deionized water), an aqueous ammonium persulfate (APS) initiator solution (2.0 g APS in 22 g deionized water), and 4.7% by weight of Monomer Emulsion 1 obtained above were then added into the flask. Within about 5 minutes, initiation of polymerization was confirmed by a temperature increase by 6° C. and a change of the external appearance of the reaction mixture. After heat generation stopped, the remaining Monomer Emulsion 1 was added gradually to the flask over a period of 90 minutes with stirring, and the temperature was maintained at 79-81° C. Monomer Emulsion 2 obtained above was then added into the flask in the same manner as Monomer Emulsion 1 over 90 minutes. Upon completing addition, the reaction mixture was held at 70° C. for 60 minutes, then cooled down to 50° C. and neutralized to a pH value of 7.0-8.0 by a 30% aqueous ammonia solution. The obtained mixture was held at 45-50° C. for 10 minutes. Then ADH slurry (40% active in water) was post-added into the flask over 10 minutes. The resultant mixture was cooled down to room temperature to obtain the aqueous polymer dispersion.

Exs 2-6 Aqueous Polymer Dispersions

Aqueous polymer dispersions of Exs 2-6 were prepared according to the same procedure as described above for preparing the aqueous polymer dispersion of Ex 1, wherein Monomer Emulsion 1 and Monomer Emulsion 2 were prepared based on formulations described in Table 1, respectively.

TABLE 1*

| | | Comp Ex A | Comp Ex B | Ex 1 | Ex 2 | Ex 3 | Ex 4 | Ex 5 | Ex 6 |
|---|---|---|---|---|---|---|---|---|---|
| Monomer Emulsion 1 (g) | ST | 153.30 | 295.56 | 147.78 | 147.78 | 137.88 | 147.78 | 147.78 | 147.78 |
| | MMA | 153.30 | 0 | 147.78 | 147.78 | 137.88 | 147.78 | 147.78 | 147.78 |
| | 2-EHA | 339.18 | 334.82 | 334.82 | 334.82 | 328.29 | 334.82 | 334.82 | 334.82 |
| | HEMA | 0 | 13.10 | 13.10 | 13.10 | 39.39 | 13.10 | 13.10 | 13.10 |
| | MAA | 13.30 | 13.10 | 13.30 | 13.30 | 13.10 | 13.30 | 13.30 | 13.30 |
| | A-174 | 0 | 1.98 | 1.97 | 6.53 | 6.53 | 8.60 | 8.60 | 8.60 |

TABLE 1*-continued

|  |  | Comp Ex A | Comp Ex B | Ex 1 | Ex 2 | Ex 3 | Ex 4 | Ex 5 | Ex 6 |
|---|---|---|---|---|---|---|---|---|---|
| Monomer Emulsion 2 (g) | ST | 240.13 | 229.34 | 228.88 | 228.88 | 228.88 | 228.88 | 219.03 | 205.90 |
|  | MMA | 240.13 | 229.34 | 228.88 | 228.88 | 228.88 | 228.88 | 219.03 | 205.90 |
|  | 2-EHA | 164.96 | 164.30 | 163.48 | 163.48 | 163.48 | 163.48 | 163.48 | 163.48 |
|  | DAAM | 0 | 19.70 | 19.70 | 19.70 | 19.70 | 19.70 | 39.40 | 65.67 |
|  | MAA | 13.30 | 13.10 | 13.10 | 13.10 | 13.10 | 13.10 | 13.10 | 13.30 |
|  | A-174 | 0 | 0 | 0 | 6.53 | 6.53 | 8.60 | 6.53 | 6.53 |
| Monomer (wt %), based on the total weight of monomers | ST | 29.61 | 39.57 | 28.42 | 28.18 | 27.44 | 28.09 | 27.44 | 26.46 |
|  | MMA | 29.61 | 17.27 | 28.42 | 28.18 | 27.44 | 28.09 | 27.44 | 26.46 |
|  | 2-EHA | 37.82 | 37.59 | 37.59 | 37.28 | 36.79 | 37.16 | 37.28 | 37.28 |
|  | HEMA | 0 | 0.99 | 0.99 | 0.98 | 2.95 | 0.98 | 0.98 | 0.98 |
|  | DAAM | 0 | 1.49 | 1.49 | 1.47 | 1.47 | 1.47 | 2.95 | 4.91 |
|  | MAA | 1.98 | 1.96 | 1.96 | 1.96 | 1.96 | 1.96 | 1.96 | 1.96 |
|  | A-174 | 0 | 0.15 | 0.15 | 0.98 | 0.98 | 1.30 | 0.98 | 0.98 |
|  | COPS-3 | 0.98 | 0.98 | 0.98 | 0.97 | 0.97 | 0.95 | 0.97 | 0.97 |
| Post added ADH (g) |  | 0 | 7.88 | 7.88 | 7.88 | 7.88 | 7.88 | 15.76 | 26.27 |

*All examples used 1.1 wt % of POLYSTEP P-12A surfactant, based on the total weight of monomers.

Comparative (Comp) Exs A-B Aqueous Polymer Dispersion

Aqueous polymer dispersions of Comp Exs A-B were prepared according to the same procedure as described above for preparing the aqueous polymer dispersion of Ex 1, wherein Monomer Emulsion 1 and Monomer Emulsion 2 were prepared based on formulations described in Table 1. Comp Ex A is substantially the same as disclosed in US20100240822A1.

Properties of the aqueous polymer dispersions obtained above were reported in Table 2.

TABLE 2

| Aqueous Polymer Dispersion | Properties of aqueous polymer dispersion ||||
|---|---|---|---|---|
|  | Solids (wt %) | Particle size (nm) | pH value | $T_g$* (° C.) |
| Comp Ex A | 42.96 | 105 | 7.90 | −0.35 |
| Comp Ex B | 42.66 | 102 | 7.59 | −1.69 |
| Ex 1 | 42.43 | 115 | 7.15 | −1.39 |
| Ex 2 | 43.82 | 110 | 7.44 | −1.38 |
| Ex 3 | 43.77 | 115 | 7.83 | −0.98 |
| Ex 4 | 43.35 | 111 | 7.81 | −1.37 |
| Ex 5 | 43.05 | 115 | 7.95 | −2.47 |
| Ex 6 | 43.26 | 112 | 7.98 | −3.90 |

*$T_g$ is calculated by the method described above.

Exs 7-12 and Comp Exs C-D Coating Composition

Coating compositions of Exs 7-12 and Comp Exs C-D were prepared based on formulations described in Table 3. The ingredients listed in Table 3 (let down) were mixed using a conventional lab mixer. The obtained coating compositions were coated on a dark substrate, and then evaluated according to the test methods described above. Properties of the obtained films were shown in Table 4. All the coating films had a gloss (60°) of 20%.

TABLE 3

| Materials | Dosage (gram) |
|---|---|
| Aqueous Polymer dispersion | 726 |
| Water | 84.9 |
| DOWANOL Butyl CELLOSOLVE | 30 |
| DOWANOL DPnB | 10 |

TABLE 3-continued

| Materials | Dosage (gram) |
|---|---|
| TEGO Airex 902w | 3 |
| BYK-346 | 3.1 |
| DEUTERON MK | 40 |
| Water | 150 |
| ACRYSOL RM-8W | 3 |
| Total | 1050 |

As shown in Table 4, the coating composition of Comp Ex C comprising the aqueous dispersion of Comp Ex A provides coating films with unacceptable poor 48% alcohol resistance, paraffin oil resistance and early block resistance. When the weight ratio of ST/(MMA and MAA) used for preparing the aqueous dispersion of Comp Ex B was more than 2.0, the coating composition (Comp Ex D) comprising such aqueous dispersion results in poor paraffin oil resistance and unsatisfactory early block resistance of the resultant coating film. In contrast, the coating compositions of Exs 7-12 provide coating films with good chemical resistance (the water resistance, 48% alcohol resistance and paraffin oil resistance ratings all exhibit 4 or higher), as well as satisfactory early block resistance rating of C-0 or better.

TABLE 4

| Coating Composition | Aqueous polymer dispersion | Properties of coating films ||||
|---|---|---|---|---|---|
|  |  | water resistance | 48% alcohol resistance | paraffin oil resistance | early block resistance |
| Comp Ex C | Comp Ex A Polymer dispersion | 4 | 3 | 2 | F |
| Comp Ex D | Comp Ex B Polymer dispersion | 4 | 4 | 3 | E-1 |
| Ex 7 | Ex 1 Polymer dispersion | 4 | 4 | 4 | C-0 |
| Ex 8 | Ex 2 Polymer dispersion | 4 | 4 | 4 | B-1 |
| Ex 9 | Ex 3 Polymer dispersion | 4 | 4 | 4 | C-0 |
| Ex 10 | Ex 4 Polymer dispersion | 4 | 4 | 4 | C-0 |
| Ex 11 | Ex 5 Polymer dispersion | 4 | 4 | 4 | B-0 |
| Ex 12 | Ex 6 Polymer dispersion | 4 | 4 | 4 | B-0 |

What is claimed is:
1. An aqueous dispersion comprising:
(A) copolymer particles, wherein the copolymer comprises as polymerized units, based on the weight of the copolymer,

(i) from 0.5 wt % to 2 wt % of an allyl ether phosphate functional monomer;
(ii) from 0.1 wt % to 10 wt % of an ethylenically unsaturated hydroxy-functional monomer;
(iii) from 0.1 wt % to 10 wt % of a self-crosslinking monomer;
(iv) from 0.01 wt % to 1.5 wt % of an ethylenically unsaturated monomer having at least one alkoxysilane functionality;
(v) from 28 wt % to 46 wt % of a (meth)acrylate $C_6$-$C_{22}$ alkyl ester nonionic hydrophobic monomer; and
(vi) ethylenically unsaturated nonionic monomers comprising at least one hydrophobic monomer and at least one hydrophilic monomer, excluding monomers (i), (ii), (iii), (iv) and (v); wherein the weight ratio of the hydrophobic monomer to the hydrophilic monomer is from 0.5 to 2.0;
(B) from 0.3 wt % to 5 wt % of an alkyl ethoxylated phosphate or alkylphenol ethoxylated phosphate surfactant, based on the weight of the copolymer; and
(C) from 0 to 10 wt % of a compound containing at least two —$NH_2$ or —NH— functionality, or a polyfunctional carboxylic hydrazide containing at least two hydrazide groups per molecule, based on the weight of the copolymer.

2. The aqueous dispersion of claim 1, wherein the copolymer comprises as polymerized units, based on the weight of the copolymer,
(i) from 0.5 wt % to 1.5 wt % of the allyl ether phosphate functional monomer;
(ii) from 0.1 wt % to 5 wt % of the ethylenically unsaturated hydroxy-functional monomer;
(iii) from 1 wt % to 5 wt % of the self-crosslinking agent;
(iv) from 0.1 wt % to 1.3 wt % of the ethylenically unsaturated monomer having at least one alkoxysilane functionality;
(v) from 32 wt % to 40 wt % of the (meth)acrylate $C_6$-$C_{22}$ alkyl ester nonionic hydrophobic monomer; and
(vi) the ethylenically unsaturated nonionic monomers.

3. The aqueous dispersion of claim 1, wherein the ethylenically unsaturated hydroxy-functional monomer is selected from hydroxyethyl (meth)acrylate, hydroxypropyl (meth)acrylate, hydroxybutyl (meth)acrylate, or mixtures thereof.

4. The aqueous dispersion of claim 1, wherein the self-crosslinking agent is diacetone acrylamide.

5. The aqueous dispersion of any one of claim 1, wherein the ethylenically unsaturated monomer having at least one alkoxysilane functionality has the following structure:

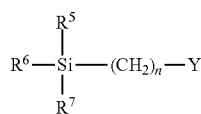

(IV)

wherein $R^5$, $R^6$, and $R^7$ each is independently selected from the group consisting of an alkoxy group and an alkyl group with the proviso that at least one alkoxy group is present, n is an integer from 0 to 4, and Y is a group selected from vinyl, methacryloxy, or mixtures thereof.

6. The aqueous dispersion of claim 1, wherein the ethylenically unsaturated monomer having at least one alkoxysilane functionality is selected from vinyl triethoxy silane, vinyl tris(β-methoxy ethoxy)-silane, γ-methacryloxy propyl trimethoxyl silane, or mixtures thereof.

7. The aqueous dispersion of claim 1, wherein the (meth)acrylate $C_6$-$C_{22}$ alkyl ester nonionic hydrophobic monomer is 2-ethylhexyl acrylate.

8. The aqueous dispersion of claim 1, wherein (vi) the hydrophobic monomer is selected from styrene or substituted styrene, butyl (meth)acrylate, iso-butyl (meth)acrylate, or mixtures thereof; and the hydrophilic monomer is selected from methyl (meth)acrylate, ethyl acrylate, (meth)acrylic acid, acrylonitrile, (meth)acrylamide, or mixtures thereof.

9. The aqueous dispersion of claim 1, wherein the allyl ether phosphate functional monomer has the following structure:

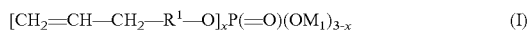

$$[CH_2\!=\!CH\!-\!CH_2\!-\!R^1\!-\!O]_xP(\!=\!O)(OM_1)_{3-x} \qquad (I)$$

wherein $R^1$ is a linking divalent group, x is an average number ranging from 1 to 2, and each $M_1$ independently comprises a hydrogen atom or a cationic counter-ion.

10. The aqueous dispersion of claim 1, wherein the alkyl ethoxylated phosphate or alkylphenol ethoxylated phosphate surfactant comprises a $C_8$ to $C_{18}$ alkyl group attached to a polyoxyethylene chain, or a $C_8$ to $C_{18}$ alkyl substituted phenol group attached to a polyoxyethylene chain, wherein said polyoxyethylene chain has an average degree of polymerization in the range of from 1 to 20.

11. The aqueous dispersion of claim 1, wherein the polyfunctional carboxylic hydrazide is selected from adipic dihydrazide, oxalic dihydrazide, isophthalic dihydrazide, polyacrylic polyhydrazide, or mixtures thereof.

12. An aqueous dispersion comprising:
(A) copolymer particles, wherein the copolymer comprises as polymerized units, based on the weight of the copolymer,
(i) from 0.5 wt % to 1.5 wt % of an allyl ether phosphate functional monomer;
(ii) from 0.1 wt % to 3 wt % of an ethylenically unsaturated hydroxy-functional monomer;
(iii) from 1 wt % to 3 wt % of diacetone acrylamide;
(iv) from 0.1 wt % to 1.3 wt % of an ethylenically unsaturated alkoxysilane-functional monomer having the following formula:

(IV)

wherein $R^5$, $R^6$, and $R^7$ each is independently selected from the group consisting of an alkoxy group and an alkyl group with the proviso that at least one alkoxy group is present, n is an integer from 0 to 4, and Y is a group selected from vinyl, methacryloxy, or mixtures thereof;
(v) from 32 wt % to 40 wt % of 2-ethylhexyl acrylate; and
(vi) ethylenically unsaturated nonionic monomers comprising at least one hydrophobic monomer selected from styrene or substituted styrene, butyl (meth)acrylate, iso-butyl (meth)acrylate, or mixtures thereof; and at least one hydrophilic monomer selected from methyl (meth)acrylate, ethyl acrylate, (meth)acrylic acid, acrylonitrile, (meth)acrylamide, polyethylene glycol (meth) acrylate, or mixtures thereof; excluding monomers (i), (ii), (iii), (iv) and (v); wherein the weight ratio of the hydrophobic monomer to the hydrophilic monomer is from 0.5 to 2.0;
(B) from 0.8 wt % to 1.7 wt % of an alkyl ethoxylated phosphate or alkylphenol ethoxylated phosphate surfactant, based on the weight of the copolymer; and
(C) from 0.5 wt % to 1.5 wt % of adipic dihydrazide, based on the weight of the copolymer.

13. A coating composition comprising the aqueous dispersion of claim 1.

14. A process of preparing the aqueous dispersion of claim 1, comprising:
(I) forming copolymer particles by emulsion polymerization from monomers in the presence of from 0.3 wt % to 5 wt % of an alkyl ethoxylated phosphate or alkylphenol ethoxylated phosphate surfactant, wherein the monomers comprise, based on the total weight of the monomers:
(i) from 0.5 wt % to 2 wt % of an allyl ether phosphate functional monomer;
(ii) from 0.1 wt % to 10 wt % of an ethylenically unsaturated hydroxy-functional monomer;
(iii) from 0.1 wt % to 10 wt % of a self-crosslinking agent;
(iv) from 0.01 wt % to 1.5 wt % of an ethylenically unsaturated alkoxysilane-functional monomer;
(v) from 28 wt % to 46 wt % of a (meth)acrylate $C_6$-$C_{22}$ alkyl ester nonionic hydrophobic monomer; and
(vi) ethylenically unsaturated nonionic monomers comprising at least one hydrophobic monomer and at least one hydrophilic monomer, excluding monomers (i), (ii), (iii), (iv), and (v), wherein the weight ratio of the hydrophobic monomer to the hydrophilic monomer is from 0.5 to 2.0; and
(II) adding from 0 to 10 wt % of a compound containing at least two —$NH_2$ or —NH-functionality, or a polyfunctional carboxylic hydrazide containing at least two hydrazide groups per molecule, based on the weight of the copolymer.

* * * * *